United States Patent
French et al.

(10) Patent No.: US 11,829,022 B2
(45) Date of Patent: Nov. 28, 2023

(54) COLOR FILTER ARRAY AND COLOR ELECTROPHORETIC DISPLAY HAVING THE SAME

(71) Applicant: E Ink Holdings Inc., Hsinchu (TW)

(72) Inventors: Ian French, Hsinchu (TW); Xian-Teng Chung, Hsinchu (TW); Liang-Yu Lin, Hsinchu (TW); Jau-Min Ding, Hsinchu (TW); Po-Yuan Lo, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 24 days.

(21) Appl. No.: 17/457,436

(22) Filed: Dec. 3, 2021

(65) Prior Publication Data
US 2022/0179260 A1 Jun. 9, 2022

Related U.S. Application Data

(60) Provisional application No. 63/122,479, filed on Dec. 8, 2020.

(51) Int. Cl.
*G02F 1/1335* (2006.01)
*G02F 1/1677* (2019.01)
*G02F 1/167* (2019.01)

(52) U.S. Cl.
CPC ........ *G02F 1/133514* (2013.01); *G02F 1/167* (2013.01); *G02F 1/1677* (2019.01)

(58) Field of Classification Search
CPC ... G02F 1/133514; G02F 1/167; G02F 1/1677
USPC .................................................. 349/106–109
See application file for complete search history.

(56) References Cited

U.S. PATENT DOCUMENTS

| | | | |
|---|---|---|---|
| 5,530,570 A * | 6/1996 | Terumoto | G02F 1/133514 349/144 |
| 7,564,615 B2 | 7/2009 | Ahn et al. | |
| 7,781,784 B2 | 8/2010 | Kim et al. | |
| 7,854,960 B2 | 12/2010 | Umehara et al. | |
| 8,582,198 B2 | 11/2013 | Nishida et al. | |
| 10,073,317 B2 | 9/2018 | Kobashi | |
| 11,209,692 B2 * | 12/2021 | Kobashi | G02F 1/1677 |
| 2002/0050976 A1 * | 5/2002 | Yamaguchi | G02F 1/167 345/105 |
| 2006/0139748 A1 | 6/2006 | Ahn et al. | |

(Continued)

FOREIGN PATENT DOCUMENTS

TW 201232062 A 8/2012

OTHER PUBLICATIONS

Corresponding Taiwan office action dated Aug. 24, 2022.

*Primary Examiner* — Charles S Chang
(74) *Attorney, Agent, or Firm* — CKC & Partners Co., LLC

(57) ABSTRACT

A color filter array includes a first color resist, a second color resist, and a third color resist. The first color resist has a first color, the second color resist has a second color, and the third color resist has a third color. A transparency of the third color resist is greater than transparencies of the first color resist and the second color resist. The first color resist has a first edge and a second edge arranged along a first direction. The second color resist has a first edge and a second edge arranged along a first direction. The first color resist and the second color resist are arranged along a second direction. The first edge of the first color resist, the second edge of the second color resist, and the second edge of the first color resist are arranged sequentially along the first direction.

15 Claims, 6 Drawing Sheets

(56) References Cited

U.S. PATENT DOCUMENTS

2016/0277722 A1* 9/2016 Guo .................. H04N 13/31
2019/0337302 A1   11/2019 Döbelt et al.

* cited by examiner

COLOR FILTER ARRAY AND COLOR ELECTROPHORETIC DISPLAY HAVING THE SAME

CROSS-REFERENCE TO RELATED APPLICATION

This application claims priority to Provisional Application Ser. No. 63/122,479, filed Dec. 8, 2020, which is herein incorporated by reference in its entirety.

BACKGROUND

Field of Invention

The present invention relates to a color filter array and a color electrophoretic display.

Description of Related Art

Regarding a current color electrophoretic display, a color images are formed by filtering a reflective light by using a printed color filter layer. However, only the reflective light within an angle range of about 60 degrees can pass through the color filter layer. In other words, if an area of the color filter layer is not large enough, the color performance quality may be reduced. However, if the area of the color filter is enlarged, grain pattern or stripe pattern may appear. As a result, the color performance quality may still be reduced.

Accordingly, it is still a development direction for the industry to provide a color electrophoretic display which may overcome the aforementioned problems.

SUMMARY

One aspect of the present disclosure is a color filter array.

In some embodiments, the color filter array includes a first color resist, a second color resist, and a third color resist. The first color resist has a first color, the second color resist has a second color, and the third color resist has a third color. A transparency of the third color resist is greater than transparencies of the first color resist and the second color resist. The first color resist has a first edge and a second edge arranged along a first direction. The second color resist has a first edge and a second edge arranged along a first direction. The first color resist and the second color resist are arranged along a second direction. The first edge of the first color resist, the second edge of the second color resist, and the second edge of the first color resist are arranged sequentially along the first direction.

In some embodiments, the first color resist and the second color resist extend along different directions.

In some embodiments, the transparency of the first color resist is smaller than the transparency of the second color resist, and an area of the first color resist is smaller than an area of the second color resist.

In some embodiments, the area of the first color resist is smaller than an area of the third color resist.

In some embodiments, the first color resist extend along the second direction, and the second color resist and the third color resist extend along the first direction.

In some embodiments, the first edge and the second edge of the first color resist and the first edge and the second edge of the second color resist extend along the second direction, and lengths of the first edge and the second edge of the first color resist are greater than lengths of the first edge and the second edge of the second color resist.

Another aspect of the present disclosure is a color electrophoretic display.

In some embodiments, the color electrophoretic display includes a display region, a pixel array, a display medium layer, and a color filter array. The display region includes a plurality of sub-pixel regions. Each of the sub-pixel regions has a length along a first direction and a width of a second direction. The pixel array corresponds to the display region in position. The display medium layer is located on the pixel array. Numbers of the first color resist, the second color resist, and the third color resist are plural.

In some embodiments, the first color resist and the second color resist extend along different directions.

In some embodiments, a pixel coverage factor of the color filter array is in a range from about 40% to about 50%.

In some embodiments, the first color resists are arranged along a third direction, and the third direction is different from the first direction and the second direction.

In some embodiments, the second color resists are arranged along a fourth direction, and the fourth direction is different from the first direction, the second direction, and the third direction.

In some embodiments, the transparency of the first color resist is smaller than the transparency of the second color resist, and an area of each of the first color resist is smaller than an area of each of the second color resist.

In some embodiments, the area of each of the first color resists is smaller than an area of each of the third color resists.

In some embodiments, the first color resists extend along the second direction, and the second color resists and the second color resists extend along the first direction.

In some embodiments, a length of each of the first color resists is smaller than the width of each of the sub-pixel regions, and a width of each of the first color resists is smaller than the length of each of the sub-pixel regions.

In some embodiments, a length of each of the second color resists is smaller than twice of the length of each of the sub-pixel regions, and a width of each of the second color resists is smaller than the width of each of the sub-pixel regions.

In some embodiments, the first edge and the second edge of each of the first color resist and the first edge and the second edge of each of the second color resist extend along the second direction, and lengths of the first edge and the second edge of each of the first color resist are greater than lengths of the first edge and the second edge of each of the second color resist.

In the aforementioned embodiments, the possibility of showing grain pattern on the display region that can be distinguished by the human eye can be reduced by arranging the first color resists and the second color resists having lower transparency alternatively.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
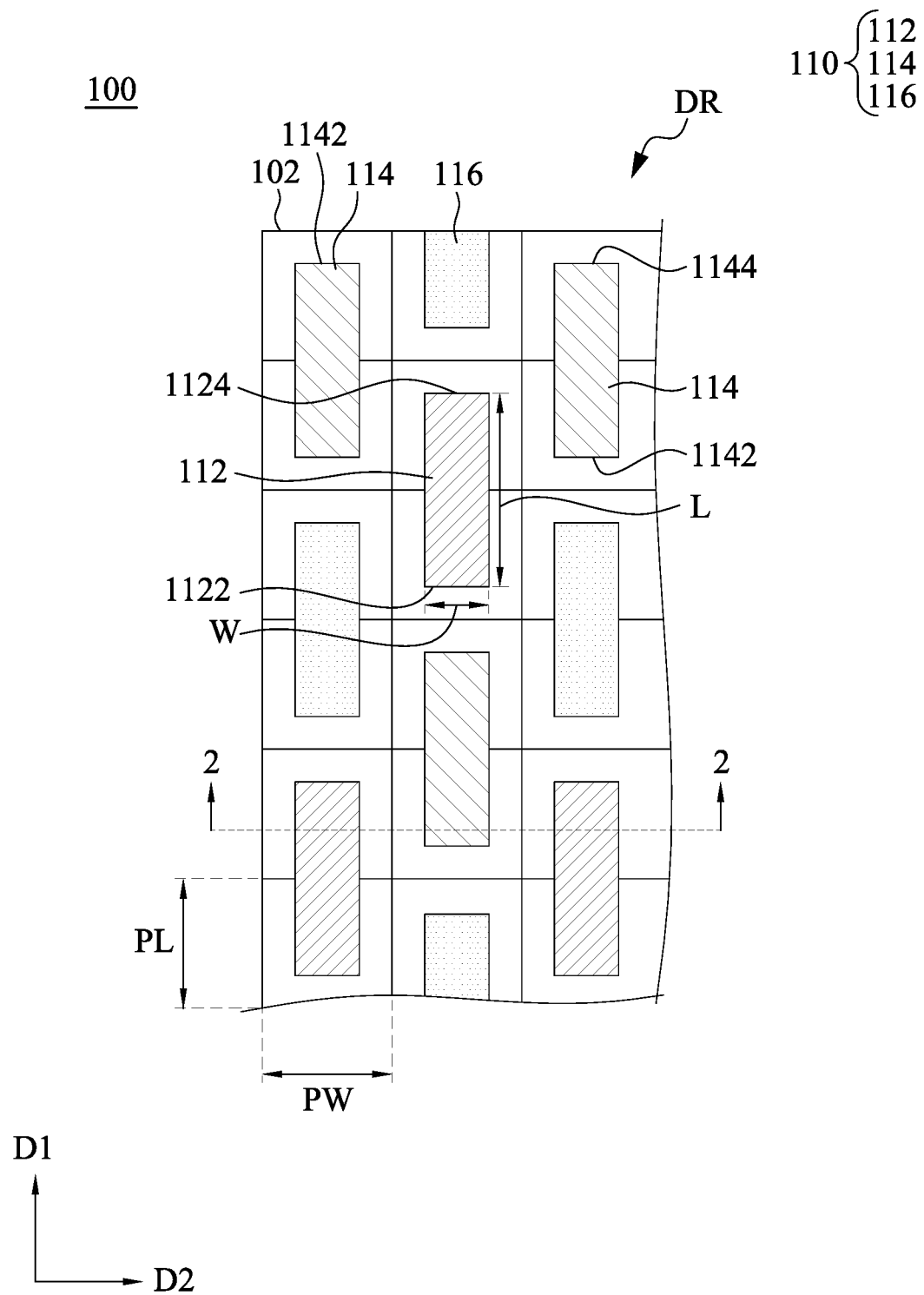
FIG. 1 is a top view of a color electrophoretic display according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
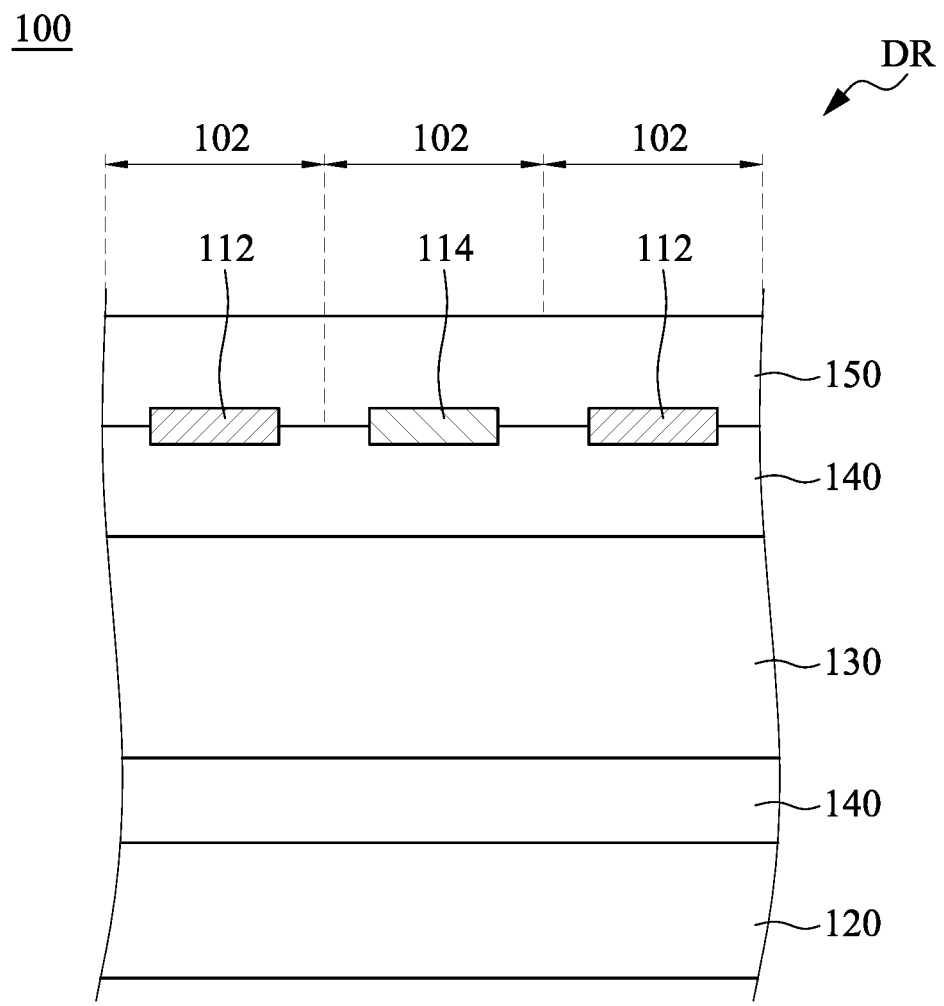
FIG. 2 is a cross-sectional view taken along the line 2-2 in FIG. 1.

FIG. 1 is a top view of a color electrophoretic display according to one embodiment of the present disclosure. FIG. 2 is a cross-sectional view taken along the line 2-2 in FIG. 1. Reference is made to FIG. 1 and FIG. 2. The color electrophoretic display 100 includes a color filter array 110, a pixel array 120, and a medium display layer 130. The medium display layer 130 is located on the pixel array 120. The color electrophoretic display 100 has a display region DR, and the display region DR includes multiple sub-pixel regions 102. Each of the sub-pixel regions 102 has a length PL along a first direction D1 and a width PW along a second direction D2.

As shown in FIG. 2, the color electrophoretic display 100 further includes two adhesive layers 140 and a transparent substrate 150. The adhesive layer 140 is located between the pixel array 120 and the medium display layer 130 and between the color filter array 110 and the medium display layer 130. The transparent substrate 150 is located on the color filter array 110. The structural configurations of the aforementioned color filter array 110 and the medium display layer 130 can change according to practical requirements, but the present disclosure is not limited thereto.

The color filter array 110 includes multiple first color resists 112, multiple second color resists 114, and multiple third color resists 116. The pixel coverage factor of the color filter array is in a range from about 40% to about 50% so as to improve reflectance of the display region DR. In addition, each of the first color resists 112, the second color resists 114, and the third color resists 116 overlaps with less than or equal to two sub-pixel regions 102. As such, the color performance of the color filter array 110 is ensured and stripes pattern that is distinguishable by the human eye is prevented.

For example, a length PL and a width PW of the sub-pixel region 102 is about 84.5 um. The length L of the first color resist 112 is from about 100 um to 150 um. Specifically, a ratio between the length L of the first color resist 112 and twice of the length PL of the sub-pixel region 102 is in a range from about 59% to 88%. A ratio between the width W of the first color resist 112 and the width PW of the sub-pixel 102 is in a range from about 41% to 65%. In the present embodiment, the lengths of the second color resists 114 and the third color resists 116 are equal to the length L and the width W of the first color resists 112, respectively.

The first color resists 112 have a first color, the second color resists 114 have a second color, and the third color resists 116 have a third color. For example, the first color resists 112 have blue color, the second color resists 114 have red color, and the third color resists 116 have green color, but the present disclosure is not limited thereto. Specifically, a transparency of a blue color resist is about 20%, a transparency of a red color resist is about 22%, and a transparency of a green color resist is about 60%. In other words, the transparency of the third color resists 116 of the present embodiment is greater than the transparency of the first color resists 112 and the transparency of the second color resists 114.

Each of the first color resists 112 has a first edge 1122 and a second edge 1124 arranged along the first direction D1. Each of the second color resists 114 has a first edge 1142 and a second edge 1144 arranged along the first direction D1. As shown in FIG. 1, the first color resist 112 in the middle and the second color resist 114 at the upper-right corner are arranged sequentially along the second direction D2. The first edge 1122 of the first color resist 112, the second edge 1144 of the second color resist 114, and the second edge 1124 of the first color resist 112 are arranged along the first direction D1. In other words, the first color resist 112 and the second color resist 114 adjacent to the former are arranged alternatively along the first direction D1. In the present embodiment, since the lengths of the first color resist 112 and the second color resist 114 are substantially the same, the first edge 1142 of the second color resist 114, the first edge 1122 of the first color resist 112, and the second edge 1144 of the second color resist 114 are sequentially arranged along the first direction D1.

Accordingly, the first color resist 112 and the second color resist 114 are partially in parallel along the second direction D2. In other words, such design can prevent grain pattern from showing on the display region DR due to cluster of the color resists having lower transparency. Therefore, the possibility of showing grain pattern on the display region DR that can be distinguished by the human eye can be reduced by arranging the first color resists 112 and the second color resists 114 having lower transparency alternatively.

Figure 3:
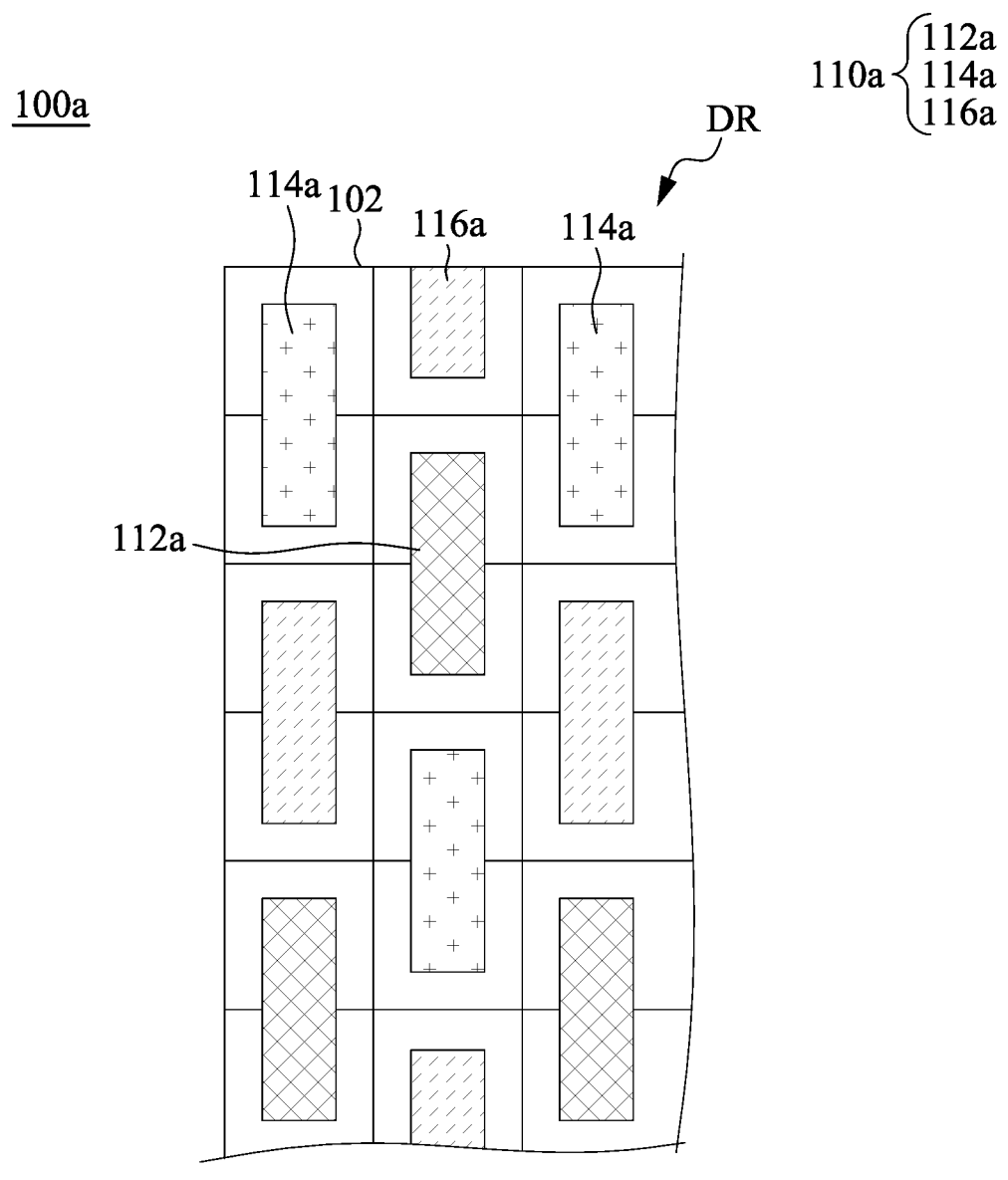
FIG. 3 is a top view of a color electrophoretic display according to another embodiment of the present disclosure.
Figure 3:
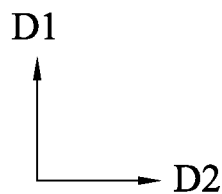

FIG. 3 is a top view of a color electrophoretic display 100*a* according to another embodiment of the present disclosure. The color electrophoretic display 100*a* is substantially the same as the color electrophoretic display 100, and the difference is that the colors of the color filter array 110*a* are different from those of the color electrophoretic display 100. For example, the first color resists 112*a* of the present embodiment have magenta color, the second color resists 114*a* have cyan color, and the third color resists 116*a* have yellow color, but the present disclosure is not limited thereto. The first color resists 112*a* and the second color resists 114*a* have lower transparency. Therefore, the possibility of showing grain pattern on the display region DR that can be distinguished by the human eye can be reduced by arranging the first color resists 112*a* and the second color resists 114*a* having lower transparency alternatively.

Figure 4:
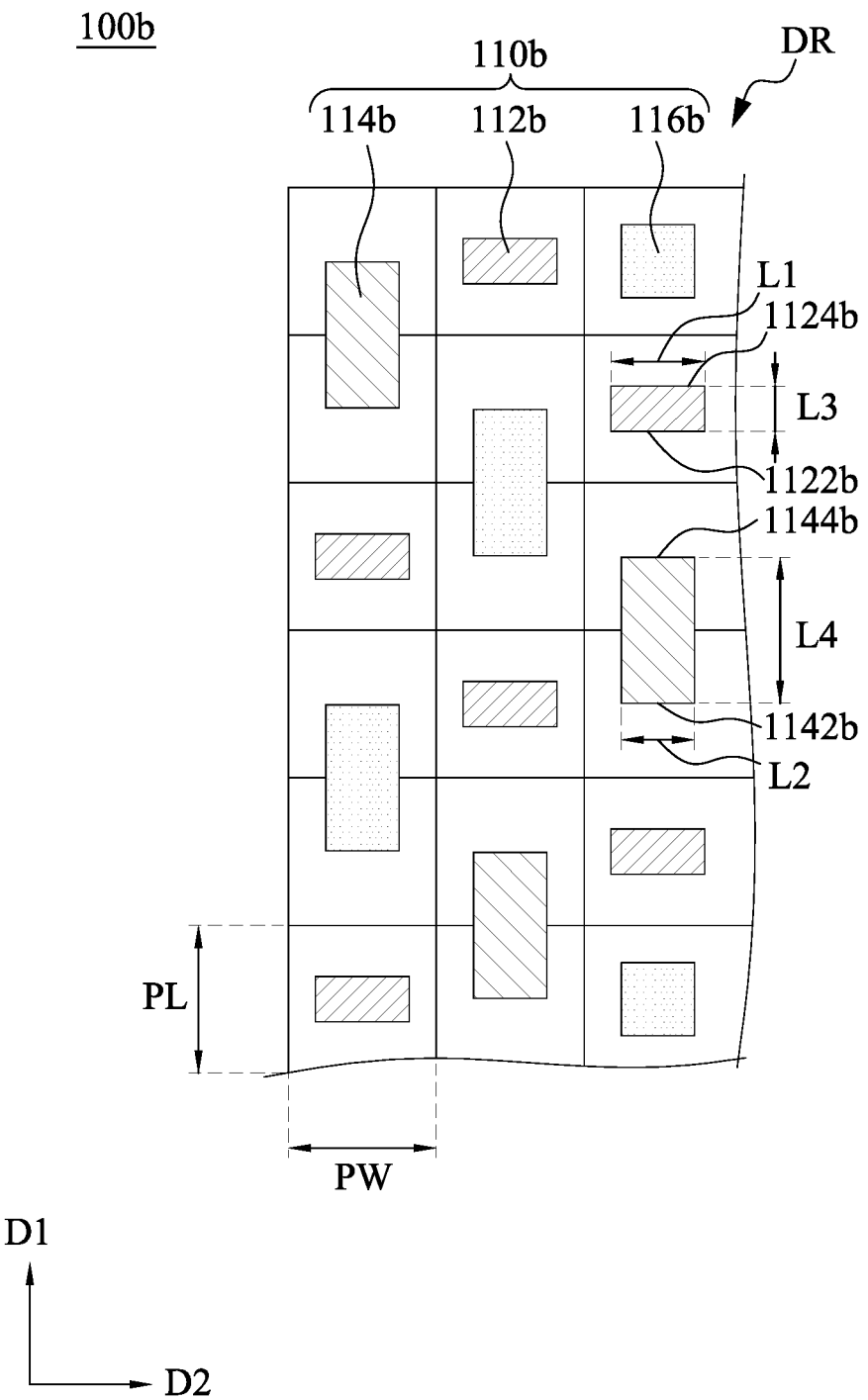
FIG. 4 is a top view of a color electrophoretic display according to another embodiment of the present disclosure.

FIG. 4 is a top view of a color electrophoretic display 100*b* according to another embodiment of the present disclosure. The color electrophoretic display 100*b* is substantially the same as the color electrophoretic display 100, and the difference is that the size of the color filter array 110*b* is different from that of the color electrophoretic display 100. In the present embodiment, since the transparency of the first color resists 112*b* is smaller than the transparency of the second color resists 114*b*, an area of the first color resists 112*b* is smaller than an area of the second color resists 114*b* and an area of the third color resists 116*b*. As such, the reflectance of the sub-pixel regions 102 wherein the first color resists 112*b* having lower transparency located in can be increased.

In addition, the first color resists 112*b* and the second color resists 114*b* of the present disclosure extend along different directions. The first color resists 112*b* extend along the second direction D2, and the second color resists 114*b* and the third color resists 116*b* extend along the first direction D1. The first edge 1122*b* and the second edge 1124b of the first color resists 112b and the first edge 1142b and the second edge 1144b of the second color resists 114b extend along the second direction D2. Lengths L1 of the first edge 1122b and the second edge 1124b of the first color resists 112b are greater than the lengths of the first edge 1142b and the second edge 1144b of the second color resists 114b (i.e., the width L2).

In general, if the first color resists 112b and the second color resists 114b having lower transparency are arranged along the same direction, stripe patterns that are distinguishable to human eye may appear on the display region DR (e.g., horizontal stripes or vertical stripes). Therefore, the possibility of showing stripe pattern on the display region DR that can be distinguished by the human eye can be reduced by arranging the first color resists 112b and the second color resists 114b having lower transparency alternatively.

In the present embodiment, the length L1 of the first color resists 112b (i.e., the length of the first edge 1122b) is smaller than the width PW of the sub-pixel regions 102, and the width L3 of the first color resist 122b is smaller than the length PL of the sub-pixel 102. Specifically, a ratio between the length L1 of the first color resists 112b and the width PW of the sub-pixel regions 102 is in a range from about 50% to 71%. A ratio between the width L3 of the first color resists 112b and the length PL of the sub-pixel regions 102 is in a range from about 25% to 35%.

The length L4 of the second color resists 114b is smaller than twice of the length PL of the sub-pixel regions 102, and the widths L2 of the second color resists 114b (i.e., the length of the first edge 1142b) is smaller than the width PW of the sub-pixel regions 102. Raito between the length L4 and the length PL of the sub-pixel regions 102 and the ratio between the width L2 and the width PW can be the same as the ratios of the embodiment shown in FIG. 1, and therefore the descriptions are not repeated hereinafter. In the present embodiment, the lengths and the widths of the third color resists are the same as the length L4 and the width L2 of the second color resists 114b.

Figure 5:
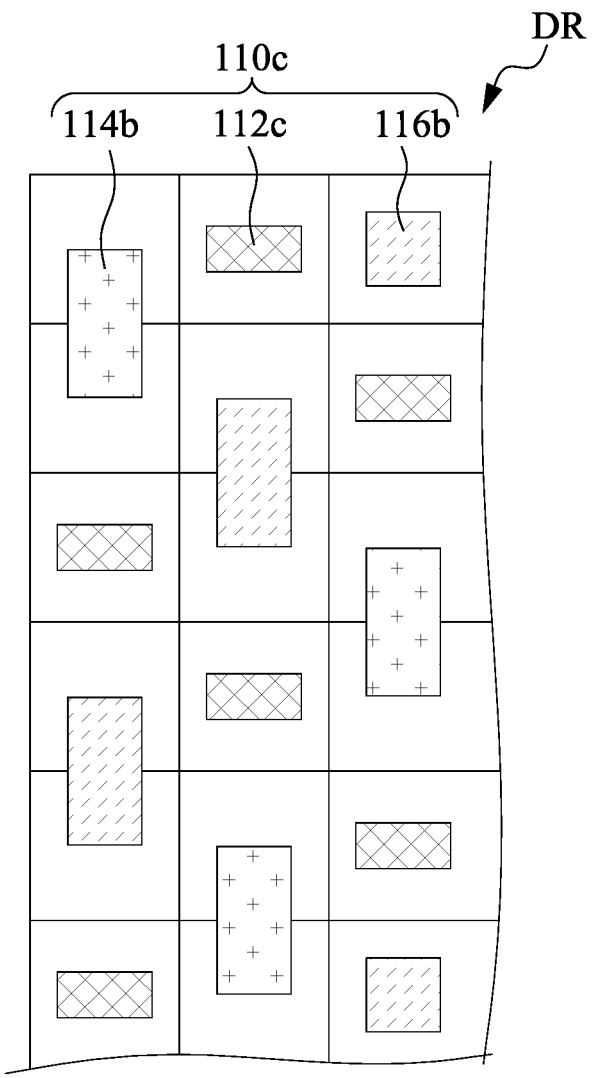
FIG. 5 is a top view of a color electrophoretic display according to another embodiment of the present disclosure.
Figure 5:

FIG. 5 is a top view of a color electrophoretic display 100c according to another embodiment of the present disclosure. The color electrophoretic display 100c is substantially the same as the color electrophoretic display 100b, and the difference is that the colors of the color electrophoretic display 100c are different from those of the color electrophoretic display 100b. The first color resists 112c of the present embodiment have magenta color, the second color resists 114c have cyan color, and the third color resists 116c have yellow color, but the present disclosure is not limited thereto. As described above, the area of the first color resists 112c is smaller than the area of the second color resists 114c and the area of the third color resists 116c. As such, the reflectance of the sub-pixel regions 102 wherein the first color resists 112c having lower transparency located in can be increased. In addition, the possibility of showing stripe pattern on the display region DR that can be distinguished by the human eye can be reduced by arranging the first color resists 112c and the second color resists 114c having lower transparency alternatively.

Figure 6:
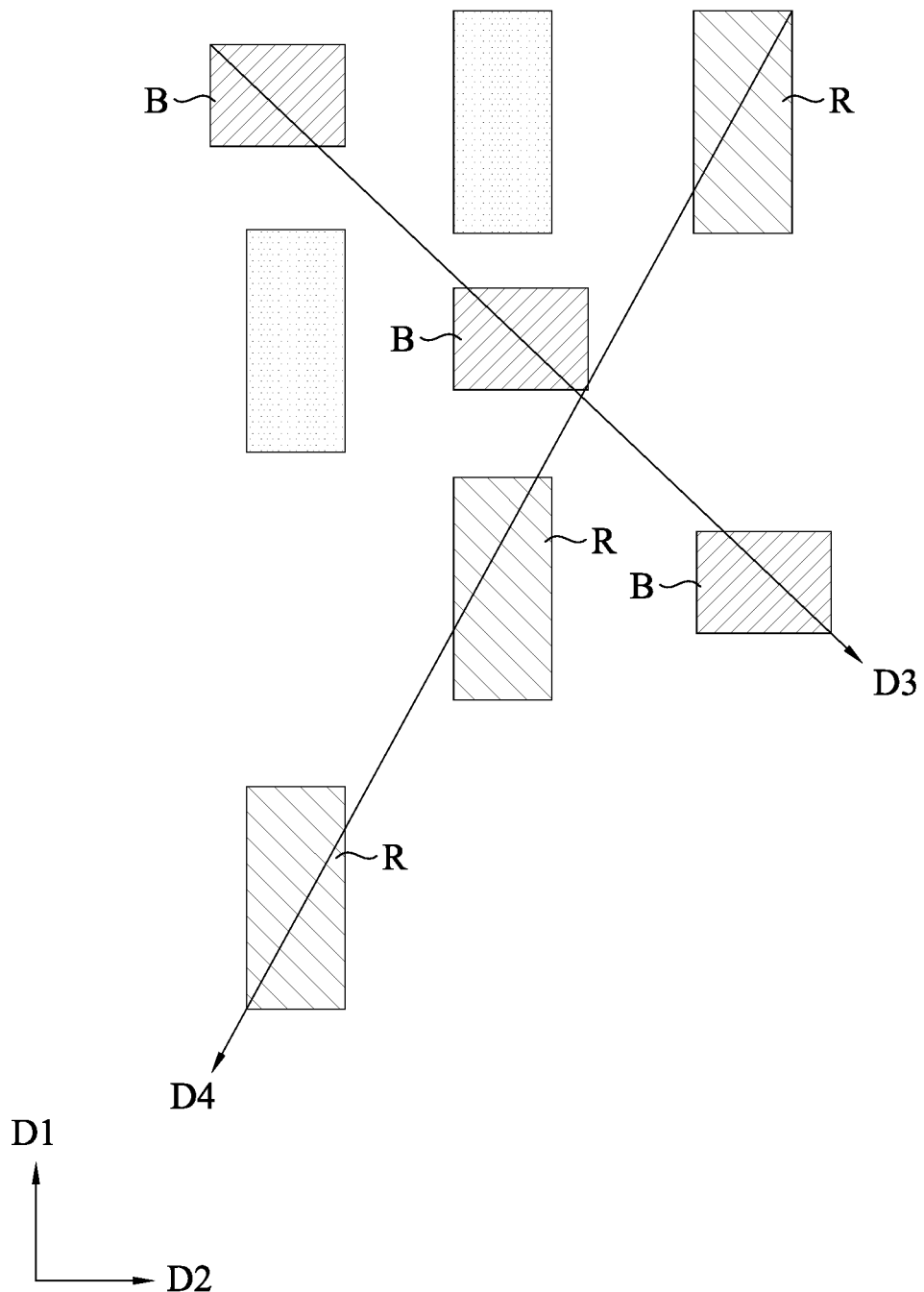
FIG. 6 is an optical microscope image of a color filter array of another embodiment of the present disclosure.

FIG. 6 is an optical microscope image of a color filter array of another embodiment of the present disclosure. The optical microscope image is derived from the color filter array 110b shown in FIG. 4. As shown in FIG. 6, the blue color resists are arranged along a third direction D3, and the third direction D3 is different from the first direction D1 and the second direction D2. The red color resists R are arranged along a fourth direction D4, and the fourth direction D4 are different from the first direction D1 and the second direction D2. Since the blue color resists B and the red color resists R extend along different directions, and therefore the fourth direction D4 is different from the third direction D3. With such design, the blue color resists B and the red color resists R won't arranged along a specific diagonal direction. Accordingly, the possibility of showing stripes pattern on the display region DR that can be distinguished by the human eye can be reduced by arranging the blue color resists and the red color resists having lower transparency alternatively and by reducing area of the blue color resists with lower transparency.

In summary, the possibility of showing grain pattern on the display region that can be distinguished by the human eye can be reduced by arranging the first color resists and the second color resists having lower transparency alternatively. In addition, the possibility of showing stripe pattern on the display region that can be distinguished by the human eye can be reduced and the reflectance of the sub-pixel region where the first color resist having lower transparency are located in can be increased by arranging the first color resists and the second color resists that have lower transparency alternatively.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A color filter array, comprising:
   a plurality of one first color resists having a first color, wherein the first color resists each comprises a first edge and a second edge arranged along a first direction;
   at least one second color resist having a second color, wherein the second color resist comprises a first edge and a second edge arranged along the first direction; and
   at least one third color resist having a third color, wherein a transparency of the third color resist is greater than a transparency of the first color resist and a transparency of the second color resist, a sequence of the color filter array along the first direction comprises one of the first color resist, the second color resist, another one of the first color resist, and the third color resist, the first edge of the first color resist, the second edge of the second color resist, and the first edge of the first color resist are arranged sequentially along the first direction, the first color resist and the second color resist extend along different directions, a second direction is a lengthwise direction of the first color resist, and the first direction is a lengthwise direction of the second color resist and the third color resist, and the second color resist is aligned with the third color resist along the first direction.

2. The color filter array of claim 1, wherein the transparency of the first color resists is smaller than the transparency of the second color resist, and an area of each of the first color resists is smaller than an area of the second color resist.

3. The color filter array of claim 2, wherein the area of each of the first color resists is smaller than an area of the third color resist.

4. The color filter array of claim 2, wherein the first color resists extend along the second direction, and the second color resist and the third color resist extend along the first direction.

5. The color filter array of claim 2, wherein the first edge and the second edge of each of the first color resists and the first edge and the second edge of the second color resist extend along the second direction, and lengths of the first edge and the second edge of each of the first color resists are greater than lengths of the first edge and the second edge of the second color resist.

6. A color electrophoretic display, comprising:
    a display region comprising a plurality of sub-pixel regions, wherein each of the sub-pixel regions has a length along a first direction and a width of a second direction;
    a pixel array corresponding to the display region in position;
    a display medium layer located on the pixel array; and
    a color filter array, comprising:
        a plurality of first color resists having a first color, wherein each of the first color resists comprises a first edge and a second edge arranged along a first direction;
        a plurality of second color resists having a second color, wherein each of the second color resists comprises a first edge and a second edge arranged along the first direction; and
        a plurality of third color resists having a third color, where a transparency of the third color resists is greater than a transparency of the first color resists and a transparency of the second color resists, one of the second color resists and one of the third color resists are located at two opposite sides of the first color resists along the first direction, each one of the second color resists are located between two of the first color resists along the first direction, and each one of the third color resists are located between two of the first color resists along the first direction, the first color resists and the second color resists are arranged along a second direction, the first edge of one of the first color resists, the first edge of one of the second color resists, and the second edge of the first color resists are arranged sequentially along the first direction, the first color resists and the second color resists extend along different directions, the second direction is a lengthwise direction of the first color resists, and the first direction is a lengthwise direction of the second color resists and the third color resists, and the second color resists are aligned with the third color resists along the first direction.

7. The color electrophoretic display of claim 6, wherein a pixel coverage factor of the color filter array is in a range from about 40% to about 50%.

8. The color electrophoretic display of claim 6, wherein the first color resists are arranged along a third direction, and the third direction is different from the first direction and the second direction.

9. The color electrophoretic display of claim 8, wherein the second color resists are arranged along a fourth direction, and the fourth direction is different from the first direction, the second direction, and the third direction.

10. The color electrophoretic display of claim 6, wherein the transparency of the first color resists is smaller than the transparency of the second color resists, and an area of each of the first color resists is smaller than an area of each of the second color resists.

11. The color electrophoretic display of claim 10, wherein the area of each of the first color resists is smaller than an area of each of the third color resists.

12. The color electrophoretic display of claim 10, wherein the first color resists extend along the second direction, and the second color resists and the third color resists extend along the first direction.

13. The color electrophoretic display of claim 10, wherein a length of each of the first color resists is smaller than the width of each of the sub-pixel regions, and a width of each of the first color resists is smaller than the length of each of the sub-pixel regions.

14. The color electrophoretic display of claim 10, wherein a length of each of the second color resists is smaller than twice of the length of each of the sub-pixel regions, and a width of each of the second color resists is smaller than the width of each of the sub-pixel regions.

15. The color electrophoretic display of claim 10, wherein the first edge and the second edge of each of the first color resists and the first edge and the second edge of each of the second color resists extend along the second direction, and lengths of the first edge and the second edge of each of the first color resists are greater than lengths of the first edge and the second edge of each of the second color resists.

* * * * *